United States Patent [19]

Rosenberg

[11] 4,243,195

[45] Jan. 6, 1981

[54] SLIDER FOR TRUCK SEAT

[76] Inventor: Monroe I. Rosenberg, 1777 Briggs Rd., Middleville, Mich. 49333

[21] Appl. No.: 939,402

[22] Filed: Sep. 5, 1978

[51] Int. Cl.³ .......................................... F16M 13/00
[52] U.S. Cl. .................................................. 248/429
[58] Field of Search .............. 248/419, 420, 429, 430, 248/424, 638

[56] References Cited

U.S. PATENT DOCUMENTS

| | | | |
|---|---|---|---|
| 1,281,921 | 11/1918 | Etherington | 248/595 |
| 1,753,047 | 4/1930 | Fromm | 248/581 |
| 1,775,082 | 9/1930 | Beardsley | 248/429 |
| 1,875,500 | 9/1932 | Roeder | 248/593 |
| 2,629,426 | 2/1953 | Hawkins | 248/566 |
| 2,850,073 | 9/1958 | Smith | 248/430 |
| 3,178,148 | 4/1965 | Manke | 248/575 |
| 3,190,592 | 6/1965 | Grizzle | 248/429 |
| 3,233,859 | 2/1966 | Beoletto | 248/566 |
| 3,258,241 | 6/1966 | Oswald | 248/430 |
| 3,325,137 | 6/1967 | Knudsen | 248/424 |
| 3,685,780 | 8/1972 | Stannebein | 248/430 X |
| 3,702,179 | 11/1972 | Radke et al. | 248/430 |

FOREIGN PATENT DOCUMENTS 2721926 5/1977 Fed. Rep. of Germany ............ 248/429

Primary Examiner—William H. Schultz
Attorney, Agent, or Firm—Blanchard, Flynn, Thiel, Boutell & Tanis

[57] ABSTRACT

A vehicle seat suspension utilizing a pair of horizontally spaced frame members each having a pair of vertically spaced guide rails mounted thereon. Each of the guide rails on one frame member is horizontally spaced and parallel to a guide rail on the other frame member so that two vertically spaced planes are defined thereby. A first base member is movably mounted on one set of guide rails and a second base member is movably mounted on the other set of spaced guide rails. Locking means are provided for selectively locking the lowermost base member to the guide rails. Resilient means are provided for resiliently connecting the two base members together and resiliently holding the upper base member in a centered position relative to the lower base member. As a result, when the locking mechanism selectively locks the lower base member to the guide rails, the upper base member will be movable in both directions along the guide rails against the urging of the resilient means. A seat construction is mounted on the upper base member. A second locking mechanism is provided to selectively lock the upper base member to the frame members.

8 Claims, 5 Drawing Figures

U.S. Patent    Jan. 6, 1981    Sheet 3 of 3    4,243,195

SLIDER FOR TRUCK SEAT

FIELD OF THE INVENTION

This invention relates to a vehicle seat suspension and, more particularly, relates to a fore and aft vibrational isolation system for a vehicle seat so that the shocks applied to the vehicle seat through varying road conditions will be absorbed by the seat suspension to isolate the user from the full effects thereof.

BACKGROUND OF THE INVENTION

Fore and aft vibrational isolation systems for vehicle seats are known. However, there are several manufacturers of vehicle seats for use in trucks and the like which do not have the capability of isolating the vehicle seat from the shocks applied thereto by movement of the vehicle so that the seat bounces and jounces the user in response to the vibrations and movements of the vehicle to which the seat is attached. A major problem in the design of highway equipment is operator fatigue, occasioned to a large extent by the bouncing and jouncing to which operators are subjected because of the stiff suspension system of the vehicle and rough road conditions over which the vehicle is to be run. Extremely heavily loaded highway types are generally the cause for the rather stiff suspensions. Conventional operator seats on such equipment are frequently referred to as "kidney-busters", and the charge is not made in jest. Moreover, the problem is aggravated by the existence of numerous variables, such as roughness of the roadway, speed, operator weight, etc., so that a seat having all of the desirable characteristics for one set of variables will probably not be at all right for a situation having a different set of variables.

In those vehicle seats which do not have the capability of absorbing shocks, an operator is faced with a decision of either staying with the vehicle seat or discarding same in favor of a new vehicle seat having structure incorporated therein which will facilitate the absorption of shocks. This latter alternative is expensive and, therefore, undesirable. Accordingly, structure which will facilitate an adaption of an existing seat construction to one having an absorption of shock characteristic is highly desirable.

It is an object of this invention to provide in an existing seat construction having no vibration isolation characteristics an attachment which will facilitate a conversion of the existing seat to one having an absorption of shock characteristic to isolate the vehicle operator from the shocks applied to the vehicle by road conditions and the like.

It is a further object of this invention to provide an attachment, as aforesaid, which is inexpensive and simple to install, thereby making it desirable to the vehicle operator to convert the seat construction to one having the aforesaid absorption of shock characteristic.

It is a further object of this invention to provide an attachment, as aforesaid, which is inexpensive, simple to operate and uses the existing equipment in the original vehicle seat to facilitate the aforesaid conversion.

It is a further object of this invention to provide an attachment, as aforesaid, which will fit between the floor of the vehicle and a base member on which the seat construction is mounted.

SUMMARY OF THE INVENTION

The objects and purposes of the invention are met by providing in a vehicle seat suspension having a pair of laterally spaced frame members, a first set of guide rails fixedly mounted on the frame members, a first base member movably supported on the first guide rails and a seat mounted on the first base member, and an attachment which has a second set of guide rails fixedly mounted on each of the frame members, which second guide rails are parallel to the first guide rails and extend therebeneath. A second base member is movably mounted on the second guide rails beneath the first base member. Locking means are provided for selectively locking the second base member to the second guide rails. Resilient means are provided for resiliently connecting the first and second base members together and resiliently holding the first base member in a centered position relative to the second base member so that when the locking means selectively locks the base member to the guide rails, the first base member having the seat thereon will be movable in both directions along the guide rails supporting same against the urging of the resilient means.

Other objects and purposes of this invention will be apparent to persons acquainted with apparatus of this general type upon reading the following specification and inspecting the accompanying drawings.

BRIEF DESCRIPTION OF THE DRAWINGS

In the drawings:

FIG. 3 is a side view of the vehicle seat suspension with my attachment;

Figure 1:
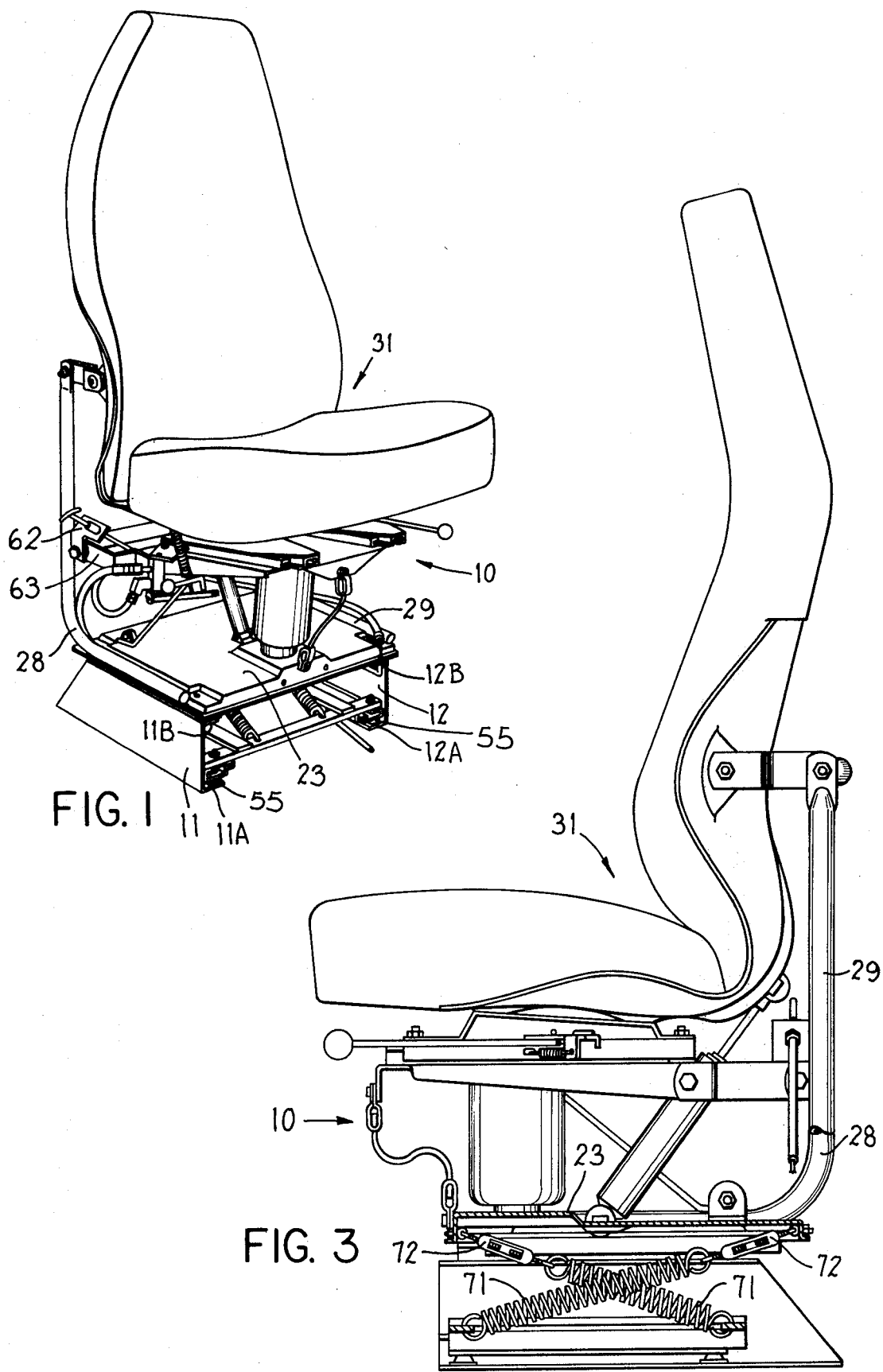
FIG. 1 is a perspective view of a seat suspension incorporating my attachment which embodies the invention.

Certain terminology will be used in the following description for convenience in reference only and will not be limiting. The words "up" and "down" will designate directions in the drawings to which reference is made. The words "front" and "rear" will refer to the front and rear of the seat construction, the front thereof being illustrated in FIG. 2. The words "in" and "out" will refer to directions toward and away from, respectively, the geometric center of the device and designated parts thereof. Such terminology will include derivatives and words of similar import.

DETAILED DESCRIPTION

The vehicle seat 10 illustrated in the drawings is distributed by the Kenworth Motor Truck Company located at 8801 East Marginal-Way, South Seattle, Wash. 98124. This seat construction includes a pair of frame members 11 and 12 which are adapted to be anchored to the floor of the vehicle. The frame members 11 and 12 are laterally spaced from each other and each has a pair of vertically spaced flanges 11A, 11B and 12A, 12B (FIG. 2) which are directed inwardly toward each other. The flanges 11A and 12A are coplanar as are the flanges 11B and 12B. The flanges 11A and 12A are secured to the floor 17 of the vehicle through the customary bolts 13.

Figure 2:
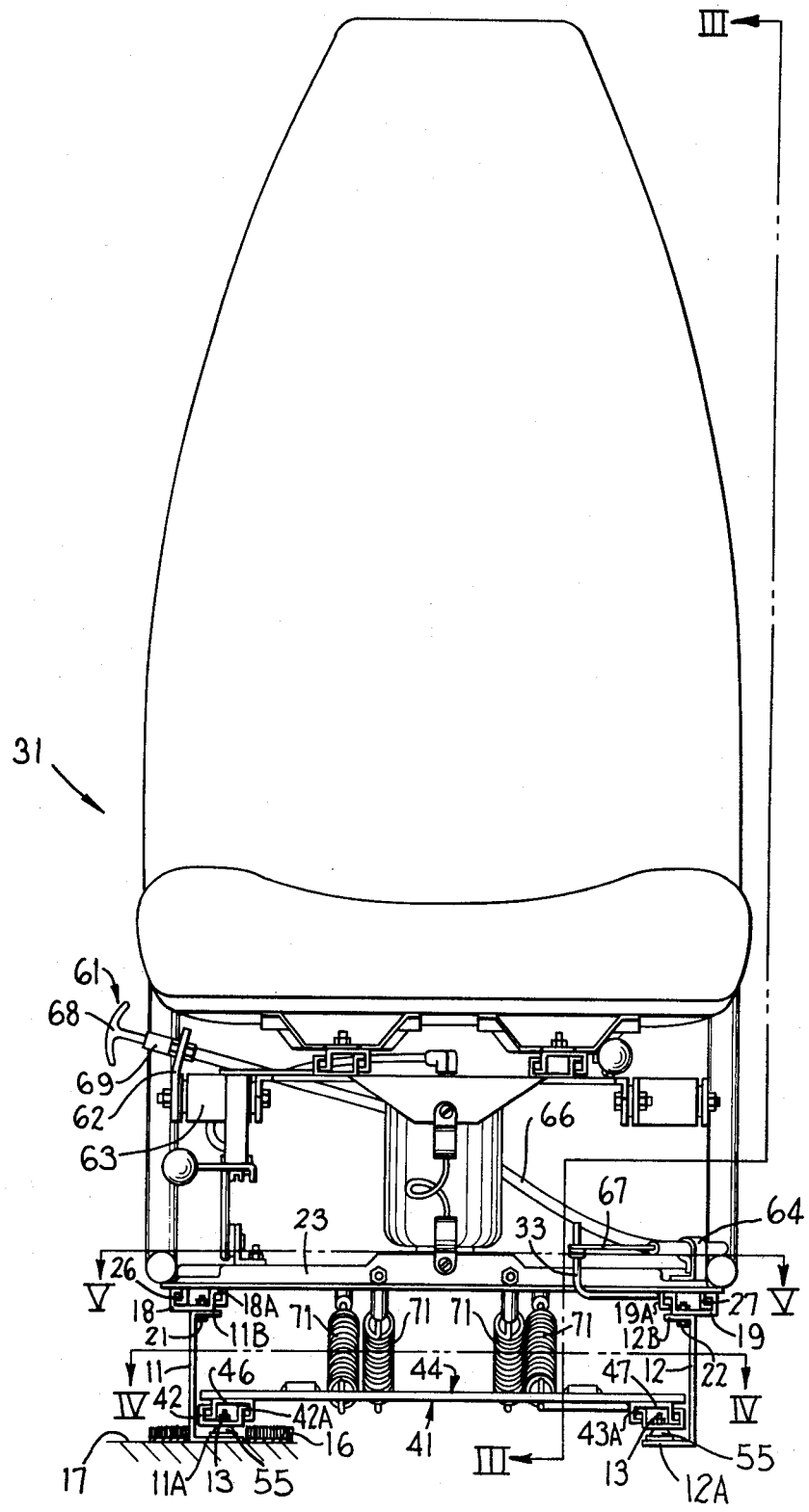
FIG. 2 is a front view of the vehicle seat suspension with my attachment.
Figure 4:
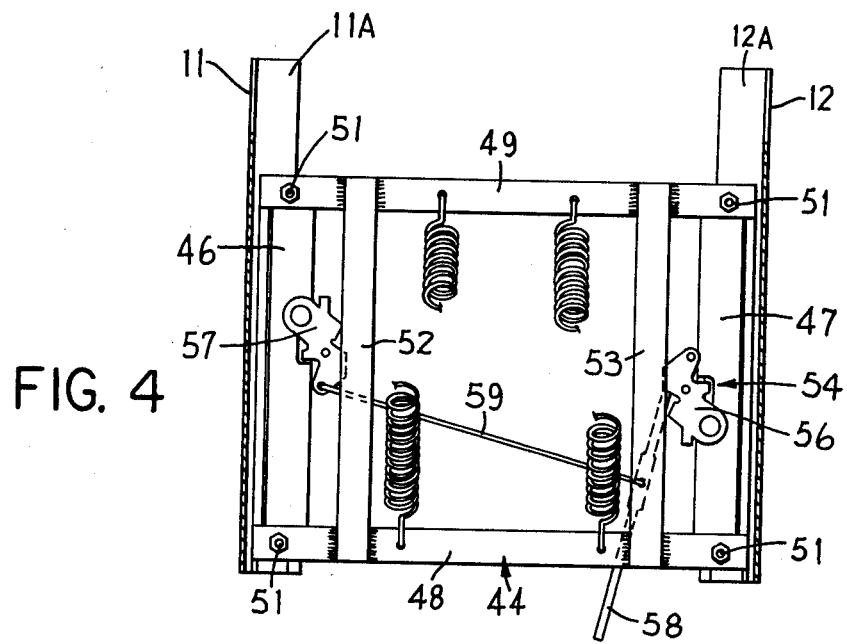
FIG. 4 is a sectional view taken along the line IV-IV in FIG. 2.

A pair of elongated guide tracks 18 and 19 are provided, one each being mounted on the upper surface of the flanges 11B and 12B. Referring to FIG. 2, the track 18 is mounted on and secured to the flange 11B by conventional fasteners 21. The track 19 is mounted on and secured to the upper surface of the flange 12B by conventional fasteners 22. Each of the elongated tracks 18 and 19 extend lengthwise of the respective frame members 11 and 12 and include a pair of laterally spaced and upstanding sidewalls with inwardly turned flanges adjacent the upper edges thereof. The innermost edge of the innermost upstanding wall of each of the tracks 18 and 19 has a serrated edge (not shown). Referring to FIG. 2, this innermost edge on the track 18 is referred to by the reference numeral 18A and for the track 19 by the reference numeral 19A.

A base plate 23 is movably mounted on the tracks 18 and 19. A pair of elongated tracks 26 and 27 are in mating engagement with the tracks 18 and 19, respectively. Each of the tracks 26 and 27 is secured to the undersurface of the base plate 23 by conventional fasteners 24. The base plate 23 is, therefore, supported for forward and rearward movement along the tracks 18 and 19.

A pair of L-shaped support members 28 and 29 are secured to the upper surface of the base plate 23. A conventional seat 31 is supported on both the base plate 23 and the support members 28 and 29. The structure associated with this particular mounting is known and will not, therefore, be described in detail.

Figure 5:
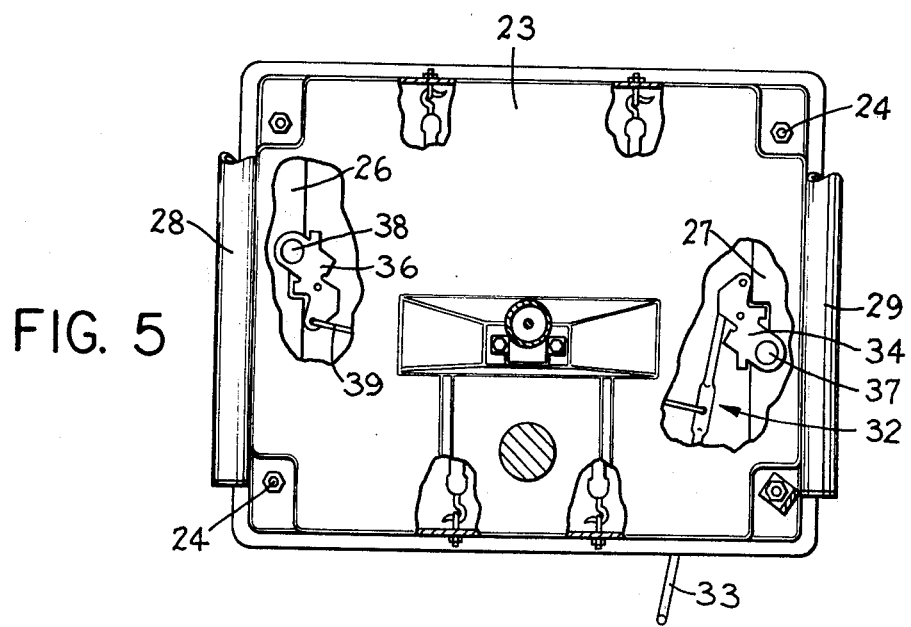
FIG. 5 is a sectional view taken along the line V-V in FIG. 2.

A conventional locking arrangement 32 (FIG. 5) is normally provided for securing the base plate and, therefore, the seat construction 31 in a fixed position on the frame members 11 and 12. A handle 33 is normally provided by the seat manufacturer to facilitate the manual manipulation of locking members 34 and 36 pivotally supported on the base plate 23 about pivot axles 37 and 38, respectively, secured to the tracks 27 and 26, respectively, for movement into and out of mating engagement with the serrations on the inwardly directed edges 18A and 19A of the tracks 18 and 19, respectively. The handle 33 is, while connected directly to the locking member 34, also connected to the locking member 36 through an auxiliary rod 39. A not illustrated spring effects a return of the handle 33 to the initial position so that the locking members 34 and 36 will be automatically moved into engagement with the serrations on the tracks 42 and 43.

The aforedescribed seat construction is conventional and the description of the various components has been provided for background information only. My invention resides in the following description modifying the aforedescribed seat construction so that it is adapted to absorb shocks caused by vehicle movement relative to the vehicle occupant.

My attachment or conversion unit 41 is provided between the floor 17 of the vehicle and the base plate 23 of the conventional seat construction 31. My conversion unit 41 is composed of a track 42 mounted on the upper surface of the flange 11A of the frame member 11 and a track 43 mounted on the upper surface of the flange 12A of the frame member 12. The tracks 42 and 43 are identical to the tracks 18 and 19. The inwardly directed edges 42A and 43A of the innermost inwardly directed flange of the tracks 42 and 43, respectively, have serrations thereon (not shown). My conversion unit 41 also includes a base member 44 having a pair of track members 46 and 47 mounted on the underside thereof and matingly cooperate with the tracks 42 and 43, respectively. The tracks 42 and 43 have outwardly directed flanges at the lower end of the downwardly depending sidewalls so that, like the combination of the tracks 18, 19 and 26, 27, upward movement of the base member 44 is prevented by the engagement between the inwardly directed flanges on the tracks 42 and 43 with the outwardly directed flanges on the tracks 46 and 47.

The base member 44 is composed of a pair of laterally extending frame members 48 and 49 interconnected at the lateral ends thereof by the aforementioned tracks 46 and 37 and conventional fasteners 51. Additional reinforcement of the base member 44 is provided by front-to-rear extending braces 52 and 53 which are secured by any convenient means to the frame members 48 and 49, as by welding.

A lock mechanism 54 is provided for effecting a securement of the base member 44 to the frame members 11 and 12. The locking mechanism 54 is essentially identical to the locking mechanism 32. Thus, I have been able to utilize the same components that are normally used for constructing the basic seat construction for my conversion unit 41. In this particular embodiment, the locking mechanism 54 has a pair of locking members 56 and 57 pivotally supported on the tracks 47 and 46, respectively, for movement into and out of the serrations on the laterally inwardly directed edges 42A and 43A of the tracks 42 and 43, respectively. A handle 58 is connected directly to the locking member 56 and through an auxiliary rod 59 to the locking member 57. A lateral movement of the handle 56 will effect a pivoting of the locking members 56 and 57 simultaneously out of engagement with the serrations on the tracks 42 and 43 to facilitate a manipulation of the base member 44 along the length of the tracks 42 and 43. A not illustrated spring effects a return of the handle 58 to the initial position so that the locking members 56 and 57 will be automatically moved into engagement with the serrations on the tracks 42 and 43.

My conversion unit also includes the provision of a spacer 55 (FIG. 2) having a not illustrated opening therethrough, which spacer is received between the flanges 11A and 12A of frame members 11 and 12 and the bottom surfaces of the tracks 42 and 43, respectively. The bolts 13 extend through the opening in the spacer.

My conversion unit 41 also includes a modification of the locking mechanism 32. More specifically, and referring to FIG. 2, as stated above, a spring is normally provided for returning the handle 33 to a position to effect a locking of the base plate 23 to the frame members 11 and 12. In my conversion unit, I render this return spring ineffective by providing a control mechanism 61. The control mechanism 61 includes a bracket 62 secured to a frame member 63 provided on the conventional seat construction 31. A second bracket 64 is provided adjacent the track 27 mounted on the underside of the base plate 23. A conduit 66 is secured to and extends between the brackets 62 and 64. A control cable 67 is slidably disposed within the conduit 66. One end of the cable 67 has a handle 68 secured thereto. The other end of the cable 67 is secured to the handle 33 by any convenient means. The handle 68 is lockable in any desired position by a conventional locking mechanism 69. In my conversion unit, I normally manipulate the handle 68 and lock same via the locking mechanism 69 so that the locking members 34 and 36 are out of engagement with the serrations on the tracks 18 and 19.

On the other hand, the base member 44 is locked in position by engagement of the locking members 56 and 57 with the serrations on the tracks 46 and 47.

A plurality of extension springs 71 are provided and are connected to and extend between the base plate 23 and the base member 44. In this particular embodiment, a pair of extension springs 71 extend from the front edge of the base plate 23 to the rear edge of the base member 44 and another pair of extension springs 71 extend from the rear edge of the base plate 23 to the front edge of the base member 44. It is preferable that the extension springs be grouped in pairs so that, and viewing these springs from the side as is illustrated in FIG. 3, an "X" is defined by the extension springs. I have also provided turn buckles 72 between the base frame 23 and the uppermost end of each of the extension springs 71 to facilitate an adjustment of the tension in each of the springs. This turn buckle adjustment will facilitate an equalizing of the spring forces so that the base plate 23 will be guided forwardly and rearwardly along the tracks 18 and 19 without any binding occurring caused by unequal spring forces. Thus, and with the base member 44 fixedly secured by the locking members 56 and 57 to the tracks 47 and 46, respectively, the seat construction 31 is movable forwardly and rearwardly along the tracks 18 and 19 against the resilient return force offered by the extension springs 71. Thus, any shocks that would normally be applied to the vehicle seat construction are isolated by the extension springs 71 enabling the vehicle operator to remain essentially stationary while the bouncing and jouncing of the vehicle construction moves relative to the actual seat construction 31.

When the vehicle operator desires to perform a complicated maneuver and it is desired that the seat construction 31 be fixedly anchored to the frame members 11 and 12, all that the operator needs to do is to operate the control mechanism 61 to bring the locking members 34 and 36 into engagement with the serrations on the tracks 27 and 26, respectively, to effect a locking of the base plate 23 to the frame members 11 and 12.

My conversion unit 41 is unique in that it utilizes the same components that are presently being used by the manufacturer of the seat construction 31 and no additional machining needs to be performed except in the construction of my base member 44 and drilling an extra hole in each of the flanges 11A and 12A to receive the rearmost bolt holding the rear end of the tracks 42 and 43 to the flange. The base member 44 can be further simplified by, for example, effecting a fastening of the braces 52 and 53 to the frame members 48 and 49 by conventional nut and bolt fasteners.

The spacers 55 prevent an interference of the carpeting 60 that may be present in the vehicle from interfering with the sliding movement of the base member 44 along the tracks 42 and 43.

It will be obvious to persons having ordinary skill in this art that my conversion unit has not altered the basic construction of the seat construction 31 and all of the respective movements embodied in the seat construction are still present and usable.

Although the particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A vehicle seat suspension, comprising:
    a pair of horizontally spaced frame members having a finite vertical height;
    a pair of vertically spaced guide rails mounted on each of said frame members, each guide rail on one frame member being horizontally spaced from a guide rail on the other frame member so that two vertically spaced planes are defined thereby;
    a first base member movably mounted on one set of horizontally spaced guide rails;
    a second base member movably mounted on the other set of horizontally spaced guide rails;
    locking means for selectively locking said second base member to at least one of said frame members;
    resilient means resiliently connecting said first and second base members together and resiliently holding said first base member in a centered position relative to said second base member so that when said locking means selectively locks said second base member to at least one of said frame members, said first base member will be movable in both directions along said guide rails against the urging of said resilient means; and
    a seat mounted on said first base member.

2. A vehicle seat suspension according to claim 1, including second locking means for selectively maintaining an unlocking of said first base member from at least one of said frame members and to selectively facilitate a locking of said first base member to said frame member.

3. A vehicle seat suspension according to claim 1, wherein said resilient means includes at least a pair of extension springs extending between said first and second base members, one extension spring being secured at one end to and adjacent a front edge of said first base member and at the other end to and adjacent a rear edge of said second base member, the other extension spring being secured at one end to and adjacent a rear edge of said first base member and at the other end to and adjacent a front edge of said second base member.

4. A vehicle seat suspension according to claim 3, including adjustment means for adjusting the tension in each of said springs.

5. A vehicle seat suspension according to claim 3, including an additional pair of extension springs connected in the same manner as the first mentioned pair.

6. In a vehicle seat suspension having a pair of laterally spaced frame members secured to flooring on said vehicle, a first guide means fixedly mounted on said frame members, a first base member movably supported on said first guide means and a seat mounted on said first base member, and attachment means for converting said vehicle seat suspension into a vibration isolation system to prevent the shocks and vibrations applied by the vehicle to the vehicle seat from being transmitted to said vehicle seat, said attachment means comprising:
    a second guide means fixedly mounted relative to said vehicle flooring, said second guide means being parallel to and in vertically spaced relation to said first guide means;
    a second base member movably mounted on said second guide means in vertically spaced relation to said first base member;
    locking means for selectively locking said second base member to said second guide means; and resilient means resiliently connecting said first and second base members together and resiliently holding said first base member in a centered position relative to said second base member so that when said locking means selectively locks said second base member to said second guide means, said first base member will be movable in both directions along said first guide means against the urging of said resilient means.

7. A vehicle seat suspension according to claim 6, wherein said second guide means is fixedly mounted on each of said frame members below said first guide means; and wherein said second base member is mounted on said second guide means and is oriented below said first base member.

8. A vehicle seat suspension, comprising:

frame means having a finite vertical height;

a pair of vertically spaced guide rail means mounted on said frame means, each of said guide rail means being oriented in two vertically spaced planes;

a first base member movably mounted on one of said guide rail means;

a second base member movably mounted on the other of said guide rail means;

locking means for selectively locking said second base member to said frame means;

resilient means resiliently connecting said first and second base members together and resiliently holding said first base member in a centered position relative to said second base member so that when said locking means selectively locks said second base member to said frame means, said first base member will be movable in both directions along said one of said guide rail means against the urging of said resilient means; and a seat mounted on said first base member.

* * * * *